(12) United States Patent
Auriol et al.

(10) Patent No.: US 8,297,897 B2
(45) Date of Patent: Oct. 30, 2012

(54) HIGH-PERFORMANCE BLIND RIVET PARTICULARLY FOR STRUCTURAL ATTACHMENT

(75) Inventors: Pierre Auriol, Flourens (FR); Jean-Marc Auriol, Flourens (FR)

(73) Assignee: Eris SARL, Flourens (FR)

( * ) Notice: Subject to any disclaimer, the term of this patent is extended or adjusted under 35 U.S.C. 154(b) by 319 days.

(21) Appl. No.: 12/525,675

(22) PCT Filed: Feb. 6, 2008

(86) PCT No.: PCT/FR2008/050182
§ 371 (c)(1),
(2), (4) Date: Nov. 17, 2009

(87) PCT Pub. No.: WO2008/102094
PCT Pub. Date: Aug. 28, 2008

(65) Prior Publication Data
US 2010/0074710 A1  Mar. 25, 2010

(30) Foreign Application Priority Data
Feb. 7, 2007 (FR) ..................................... 07 53119

(51) Int. Cl.
*F16B 13/06* (2006.01)
(52) U.S. Cl. ........................................... 411/43; 411/38
(58) Field of Classification Search .................... 411/34, 411/38, 43, 361
See application file for complete search history.

(56) References Cited

U.S. PATENT DOCUMENTS

| 2,061,628 A | * | 11/1936 | Huck ............................... 29/509 |
| 2,397,111 A | | 3/1946 | Huck |
| 2,887,003 A | * | 5/1959 | Brilmyer .......................... 411/34 |
| 3,136,204 A | * | 6/1964 | Reynolds .......................... 411/70 |
| 3,215,024 A | * | 11/1965 | Brilmyer et al. .............. 411/361 |
| 3,277,771 A | | 10/1966 | Reynolds |
| 3,702,088 A | | 11/1972 | Schmitt |
| 4,142,439 A | * | 3/1979 | Landt .............................. 411/34 |
| 4,312,613 A | | 1/1982 | Binns |

(Continued)

FOREIGN PATENT DOCUMENTS
WO  WO 01/18408 A  3/2001

OTHER PUBLICATIONS

International Search Report, Sep. 22, 2008, from International Phase of the instant application.
English Translation of the Written Opinion of the International Search Authority, Aug. 25, 2009, from International Phase of the instant application.

(Continued)

*Primary Examiner* — Flemming Saether
(74) *Attorney, Agent, or Firm* — Jackson Patent Law Office

(57) ABSTRACT

Disclosed is blind rivet including a hollow sleeve, a crimping ring, and a mandrel, received by the hollow sleeve and by the crimping ring. The mandrel includes a head configured to bear against the sleeve, and a shank configured to receive a traction load from a tool. There is a breaking groove which breaks off when the traction load reaches a certain value. The breaking groove including a breaking groove bottom, a first breaking-groove-side extending from the breaking groove bottom toward the shank, a second breaking-groove-side extending from the breaking groove bottom towards the head. A first breaking-groove-side and a central axis of the mandrel define a first angle, and a second breaking-groove-side and the central axis define an angle greater than the first angle. An embrittlement groove is contiguous with the first breaking-groove-side.

9 Claims, 8 Drawing Sheets

U.S. PATENT DOCUMENTS

| | | | | |
|---|---|---|---|---|
| 5,152,648 A | * | 10/1992 | Pratt | 411/43 |
| 5,178,502 A | * | 1/1993 | Sadri | 411/361 |
| 5,350,264 A | * | 9/1994 | Stencel | 411/55 |
| 6,537,005 B1 | * | 3/2003 | Denham | 411/42 |
| 7,980,800 B2 | * | 7/2011 | Kleinman et al. | 411/43 |

OTHER PUBLICATIONS

English Translation of International Preliminary Report on Patentability Chapter I, Aug. 26, 2009, from International Phase of the instant application.

* cited by examiner

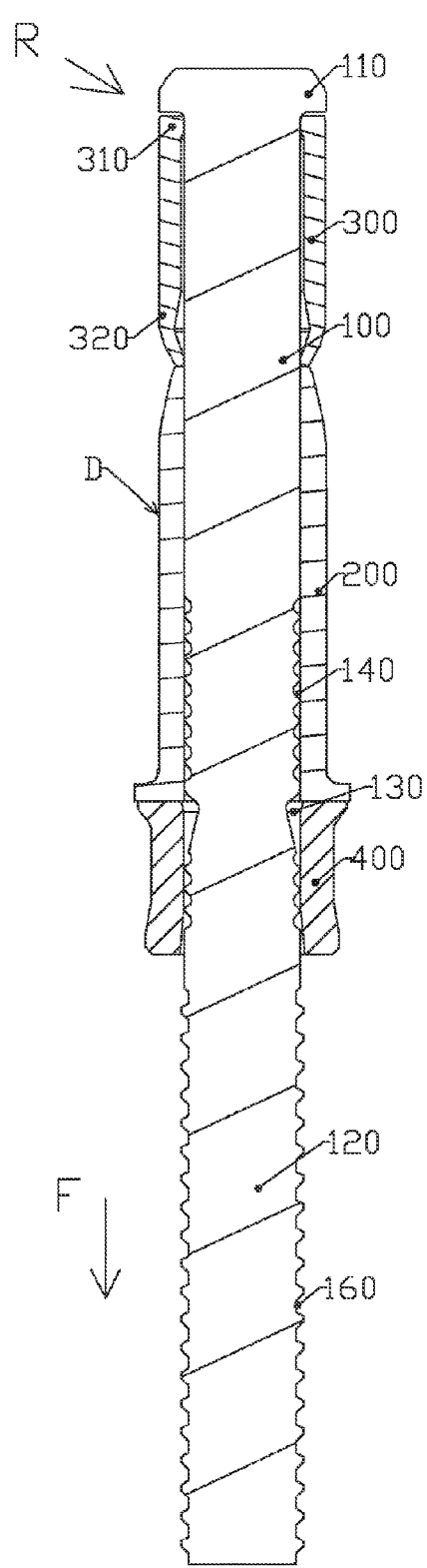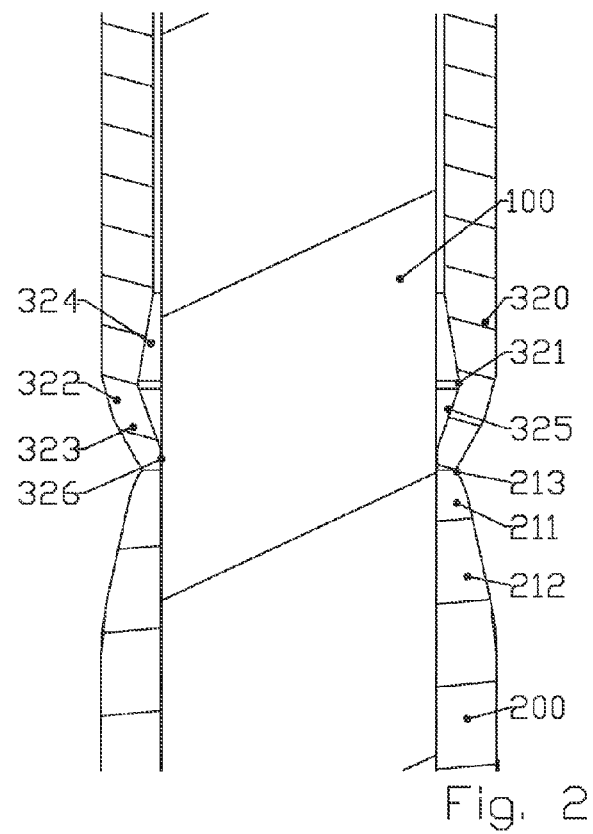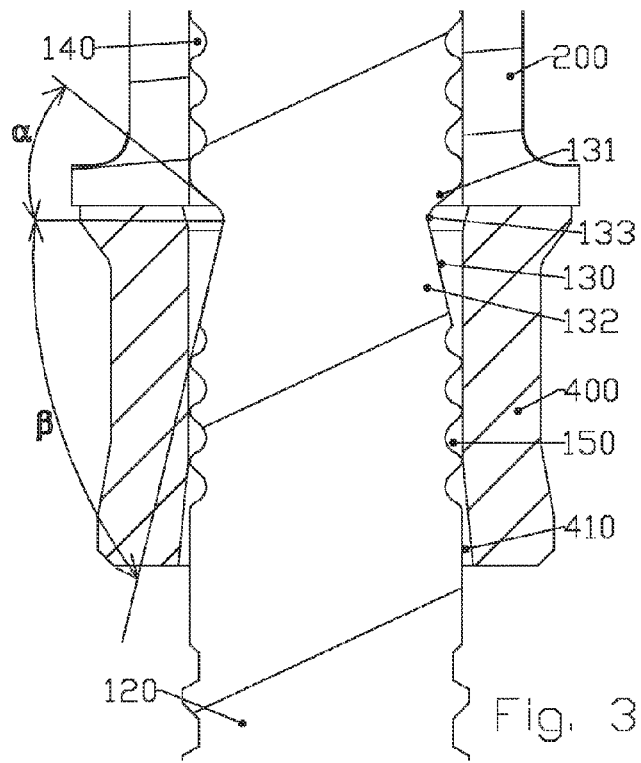

HIGH-PERFORMANCE BLIND RIVET PARTICULARLY FOR STRUCTURAL ATTACHMENT

FIELD OF THE INVENTION

This invention relates to the field of fixing by blind rivet and in particular to the adaptations making it possible to provide a fixing of a structure in the best conditions.

DESCRIPTION OF PRIOR ART

There exists in prior art blind rivets of the type comprised of a deformable hollow sleeve and of a cleavable mandrel positioned inside said sleeve. This blind rivet is urged into position by crossing the orifices arranged in at least two parts to be fixed and made substantially coaxial.

Conventionally, the sleeve comprises two ends:
a first end equipped with a preformed head in order to define a first bearing surface on the external surface of a first part, and
a second end which, under the action of a deformation via traction on the mandrel, comes to define a second bearing surface on the external surface of the second part.

The traction load has for effect the bringing nearer of the two bearing surfaces and in consequence the bringing nearer and the clamping together of the two parts to be assembled.

Complying with this configuration the rivet described in U.S. Pat. No. 5,030,050 is of the type comprising a one-piece sleeve which, provided with a countersunk head, is preformed in order to deform under the axial load in such a way that a portion of the sleeve is urged to be opened around the portion of the sleeve remaining fixed in such a way as to form an extended bearing surface on the part around the orifice.

The applicants have observed that by proposing a sleeve in a single and same part, the rivet described in U.S. Pat. No. 5,030,050 was limited in its applications, since the sleeve is made entirely from a material that accepts the deformation. Indeed, the applicants have in particular observed that such a countersunk head blind rivet that requires the breaking off of the mandrel thanks to a groove provided for this purpose did not provide a sufficient setting up of strong clamping or a clamp load.

However, the applicants have observed another disadvantage in these rivets that propose a crimping which has for function to maintain in position the mandrel and therefore to maintain the parts clamped. The disadvantage resides in the fact that the grooves made in the mandrel intended for the crimping of the ring or of the sleeve head of which is thus provided the rivet, deform during the transmission of the traction load. A deformation of these grooves results in a poor crimping and therefore a poor clamping. On the contrary, if the breaking groove is enlarged in order to allow it to break off well before any deformation of the crimping grooves, the inserting cannot be good since the total deformation of the sleeve cannot be guaranteed.

Another disadvantage observed in the use of crimping rings resides in the space that they have with the shank when they are not on crimping grooves. This space is indeed detrimental to the proper centering of the rings on the shank.

DESCRIPTION OF THE INVENTION

Using this established fact, the applicants have carried out research aiming to solve this problem with the design of the shank of the mandrel of the fixing in order to allow for a full deformation and the breaking off of the shank without the crimping grooves being deformed.

This research has resulted in the design of a fixing of the blind rivet type that overcomes the aforementioned disadvantages and which can adapt to any type of blind rivet. Likewise, another objective of the invention is to propose a rivet for fixing a structure guaranteeing the setting up of a clamp load.

The blind rivet of the invention is of the type comprised of a hollow sleeve receiving a mandrel comprising:
at a first end, a head coming to act on the sleeve,
at a second end, a shank to which clutches a tool to imprint upon it a traction load,
a breaking groove which breaks off when the traction load reaches a certain value.

In accordance with the main characteristic of the invention, this rivet is remarkable in that
the geometry of the breaking groove is defined in such a way that the connection between the groove bottom and the external diameter of the mandrel is more progressive on the shank side than on the head side,
the shank is preformed of a plurality of crimping grooves and is dimensioned in such a way that once the shank is broken on the breaking groove, a portion of the crimping grooves extend beyond the sleeve,
the shank is preformed of at least one embrittlement groove,
it comprises an added crimping ring that is urged to crimp on the crimping grooves extending beyond the sleeve by means of a tool provided with an inserting nose providing the traction on the mandrel for the purposes of deformation of the sleeve and of crimping of the ring on the mandrel.

The progressivity of the edge of the breaking groove positioned on the shank side has for effect to direct the deformation of the mandrel during the traction of the shank side, i.e. of the side that is going to be withdrawn. As such, the portion of the mandrel participating in the fixing, i.e. that receiving the crimping grooves and remaining in place is preserved from any deformation (extending and radial deformation) and can be fully used to guarantee the fixing. The crimping grooves therefore are not deformed and fulfill their functions optimizing the fixing created.

With a concern of guaranteeing the directing of the deformation of the mandrel and of confining it to the withdrawn part (after breaking off), the mandrel of the rivet of the invention is arranged with one or several embrittlement grooves on the shank side in the vicinity of the breaking groove. This or these embrittlement grooves offset the presence of the crimping groove(s) of the other side of the breaking groove.

The non-deformation of the crimping grooves associated with the presence of an added crimping ring will make it possible to guarantee a rivet in compliance with the invention having optimized performance with regards to the mechanical characteristics in traction, shearing and clamp load.

According to a particularly advantageous characteristic, the breaking groove is broken down into at least two truncated cones connected by their small base in order to form the bottom of the breaking groove, the truncated cone located on the head side having an angle that is greater than that of the truncated cone located on the shank side.

In order to propose a fixing that is able to guarantee the presence of a clamp load, the sleeve is in several portions separated in such a way that a first portion of the sleeve or bulb is urged to be opened around another portion of the sleeve remaining fixed in such a way as to form an extended bearing surface on the part around the orifice through which the rivet exits. In order to propose an adequate deformation with the fixing on materials that are able to be embrittled, the bulb and the fixed part or body of the sleeve are preformed in such a way that the end of the bulb comes to turn over by opening on the body so that the surface coming in contact with the rivet is rounded.

For this, according to a characteristic, the separated mobile part that has a first end in contact with the head of the mandrel and a second end in contact with the fixed part of the sleeve, is preformed on its second end in order to have a tapered external form and an internal form also tapered of a different angle.

According to another particularly advantageous characteristic of the invention, the various elements comprising the fixing or the rivet are made of different materials. This characteristic offered in particular by the separation into two portions of the sleeve makes it possible for example to use a material that accepts a high degree of deformation for the bulb portion and a shear-resistant material for the body portion.

In order to optimize the formation of the bulb and to propose a deformation of the mobile part as large as is possible without risking embrittlement, the rivet of the invention is remarkable in that the mobile part of the sleeve is provided with an insert which, coaxial to the mobile part of the sleeve, has a hardness less than the material of this portion of the sleeve. The presence of this insert makes it possible to increase the range of the bulb on the assembly formed by the rivet.

Such a bulb associated to the crimping described hereinabove, makes it possible to provide for the presence of a clamp load and to obtain a rivet with very high mechanical performance in accordance with the objectives of the invention.

As such, the fixing proposed by the rivet is particularly effective and allows for the presence of a clamp load or clamping. The choice of materials can therefore be adapted to the application in question.

The basic concepts of the invention have been put forth hereinabove in their most elementary form, other details and characteristics shall become clearer when reading the description which follows and with regards to the annexed drawings, provided by way of a non-limiting example, an embodiment of a rivet in accordance with the invention.

BRIEF DESCRIPTION OF THE DRAWINGS

FIG. 1 is a schematic drawing of a cross-section view of an embodiment of a rivet in accordance with the invention, FIG. 2 is a schematic drawing of a detailed view of the sleeve in FIG. 1, FIG. 3 is a schematic drawing of a detailed view of the mandrel and of the crimping ring in FIG. 1, FIGS. 4, 5, 6, 7 and 8 show the various steps of inserting the rivet in FIG. 1.

DESCRIPTION OF PREFERRED EMBODIMENTS

Figure 4:
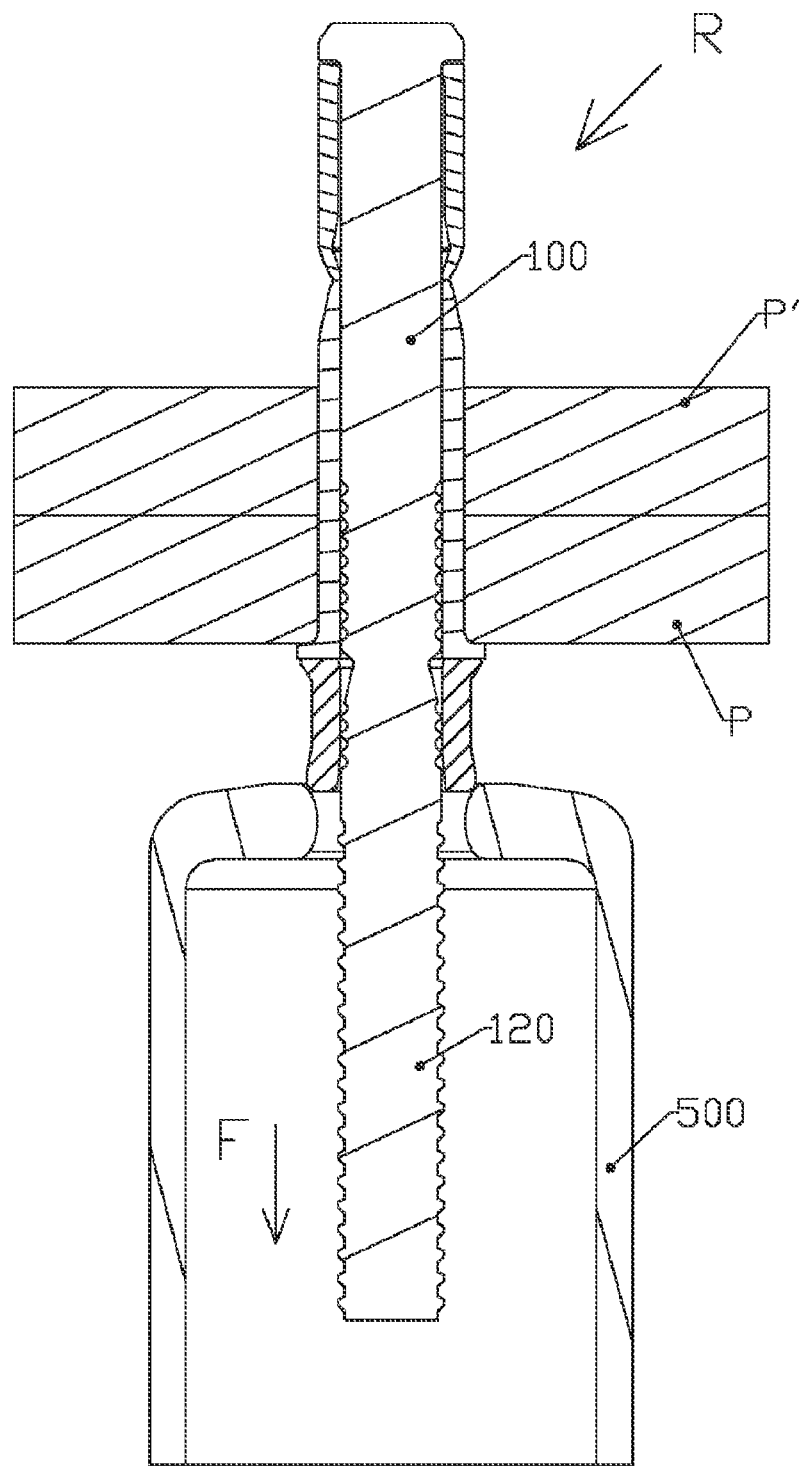

Such as shown in the drawing in FIG. 1, the fixing is comprised of the rivet referenced as R which is of the type of that comprised of a hollow sleeve D and of a mandrel 100 comprising:

at a first end, a head 110 coming to act on the sleeve D,
at a second end, a shank 120 to which clutches a tool 500 in order to imprint upon it a traction load according to the arrow F,
a breaking groove 130 which breaks off when the traction load reaches a certain value, and
a plurality of crimping grooves 140.

According to the embodiment shown, the sleeve D is broken down into two separated parts, i.e. a body 200 which remains fixed and a bulb 300 which is urged to open around said body during the movement of traction imprinted at the mandrel 100 according to the arrow F.

According to this embodiment, the rivet referenced as R is comprised of four elements:
a mandrel 100,
a body 200,
a bulb 300, and
a crimping ring 400.

The method of inserting the rivet R in order to assemble a part P to another part P' shown schematically is shown in the drawing in FIGS. 4 to 8.

As shown in the drawing in FIG. 4, once the shank is introduced into the jaws (not shown) of the inserting nose 500, and the rivet R bearing against the part P, a traction load according to the arrow F is imprinted on the shank 110 of the mandrel 100.

Figure 5:
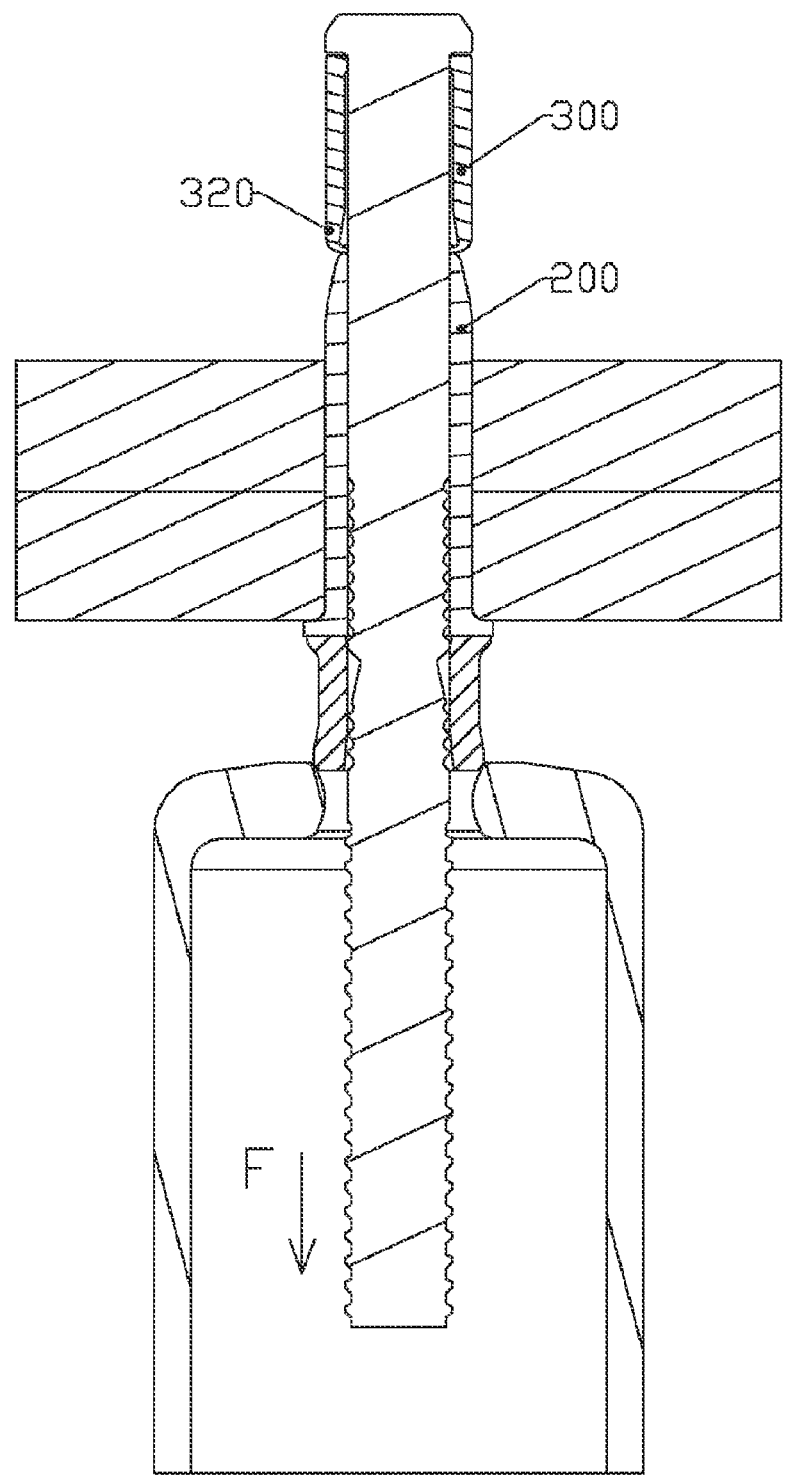

As shown in the drawing in FIG. 5, this traction has for effect the turning over of the bulb 300 which is bearing against the body 200 before the bulb touches the part P' through which exits the rivet R via an orifice provided for this purpose. As such, the bulb does not make use of its contact with the part P' to be assembled in order to be deformed which prevents damage to the part and makes it possible to guarantee the turning over of the bulb regardless of the distance to be covered. This enveloped form of the bulb also makes it possible to have a bearing with a greater distance from the edge of the orifice made in the part which allows for the use of the fixation on composite materials (no delaminating of fibers). The head of the mandrel 100 moves towards the part P' and the bulb is opened around the body by sliding over the latter.

Figure 6:
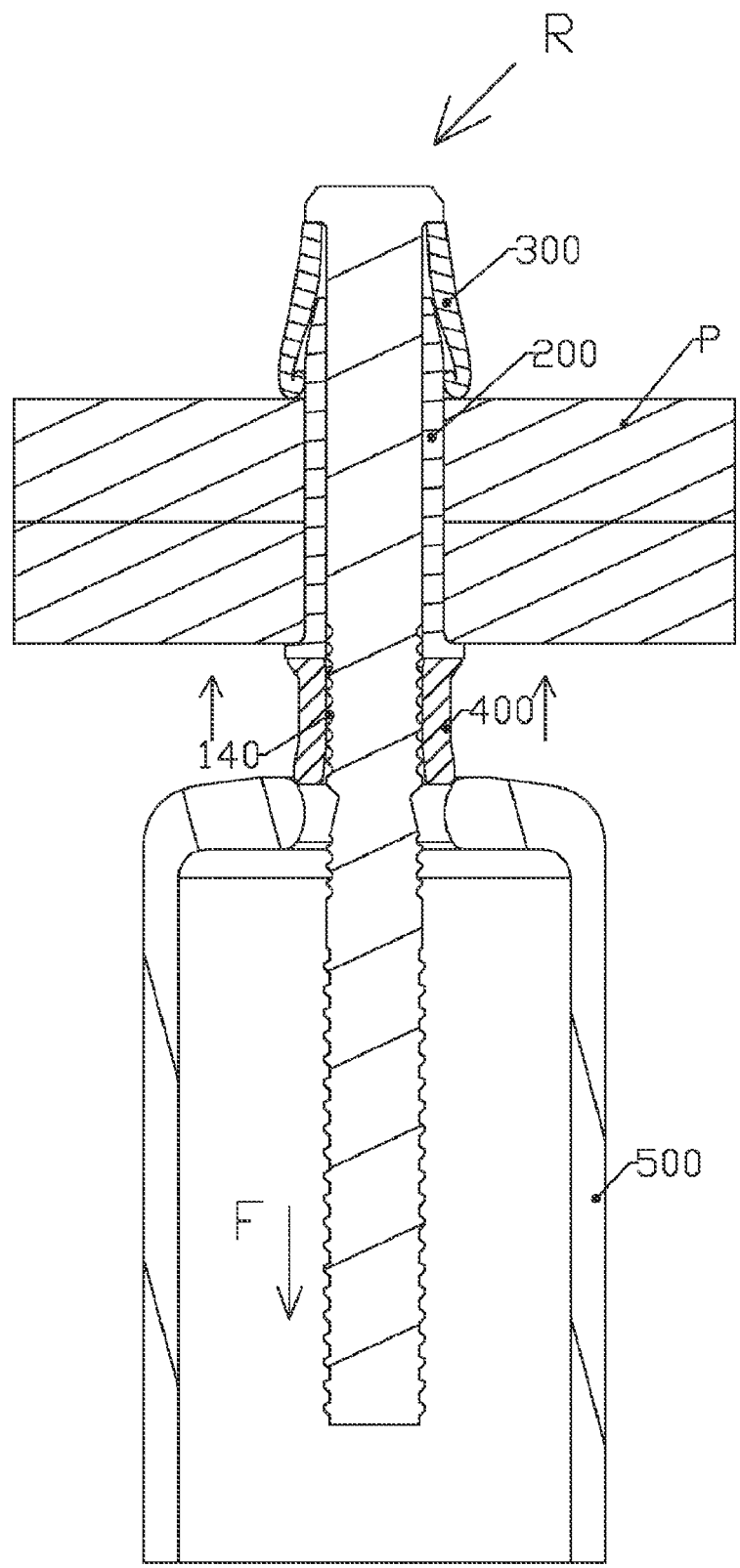

FIG. 6 shows the contact of the bulb 300 with the part P' which then defines a bearing surface (blocking all movement of the mandrel 100 of which the crimping grooves 140 are positioned beyond the sleeve on the crimping ring 400) and on the base of which the inserting nose 500 is going to bear against, in order to move towards the part P by deforming the ring 400 for the purposes of crimping. The rivet of the invention has crimping grooves over a greater length of the shank than that extending beyond the sleeve in order to provide several possibilities of thicknesses to be clamped. According to a preferred embodiment but not limiting, at least half of the crimping grooves must be occupied by the material of the ring in order to attain the mechanical characteristics that are sought for this rivet.

Figure 7:
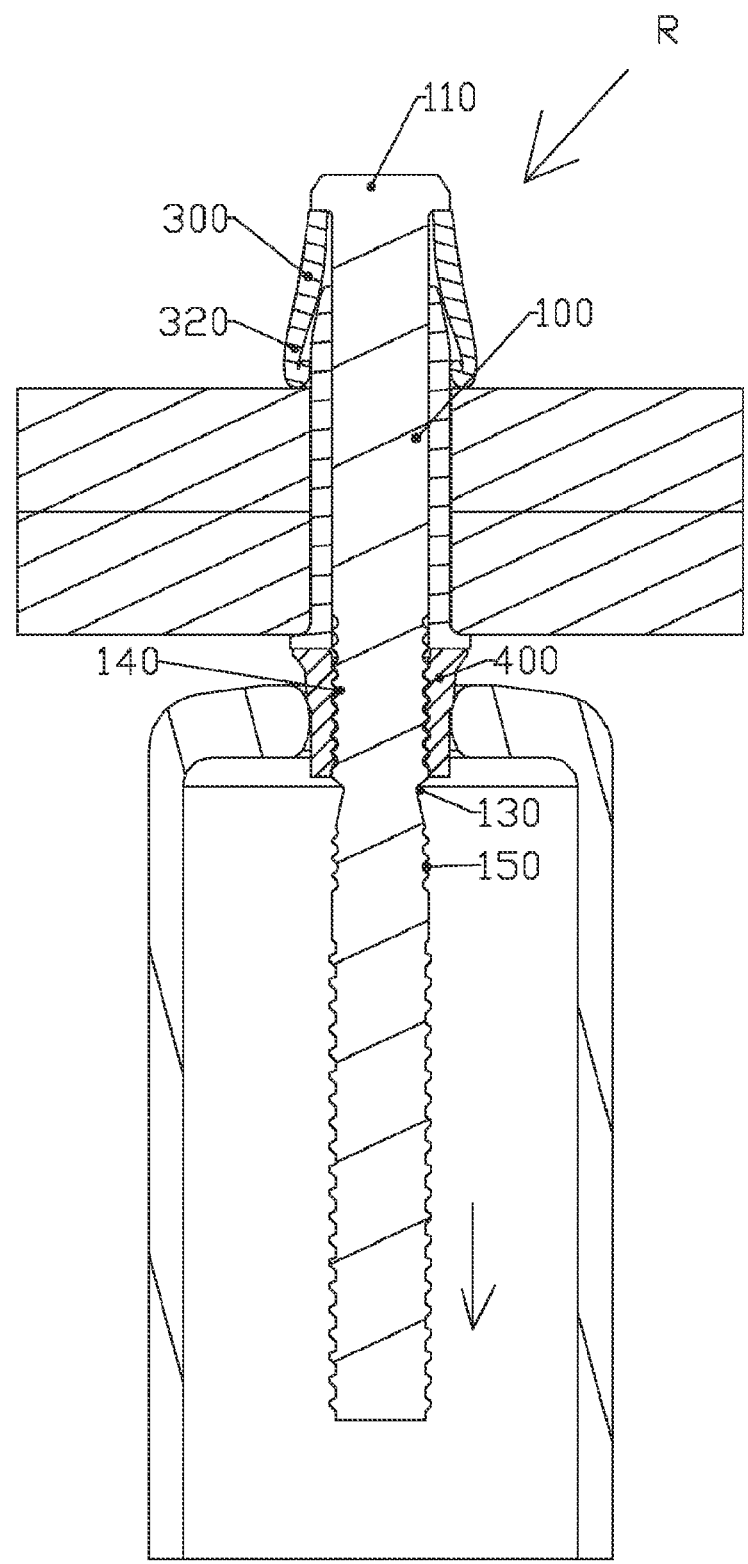

FIG. 7 shows the crimping of the ring 400 on the crimping grooves 140.

Figure 8:
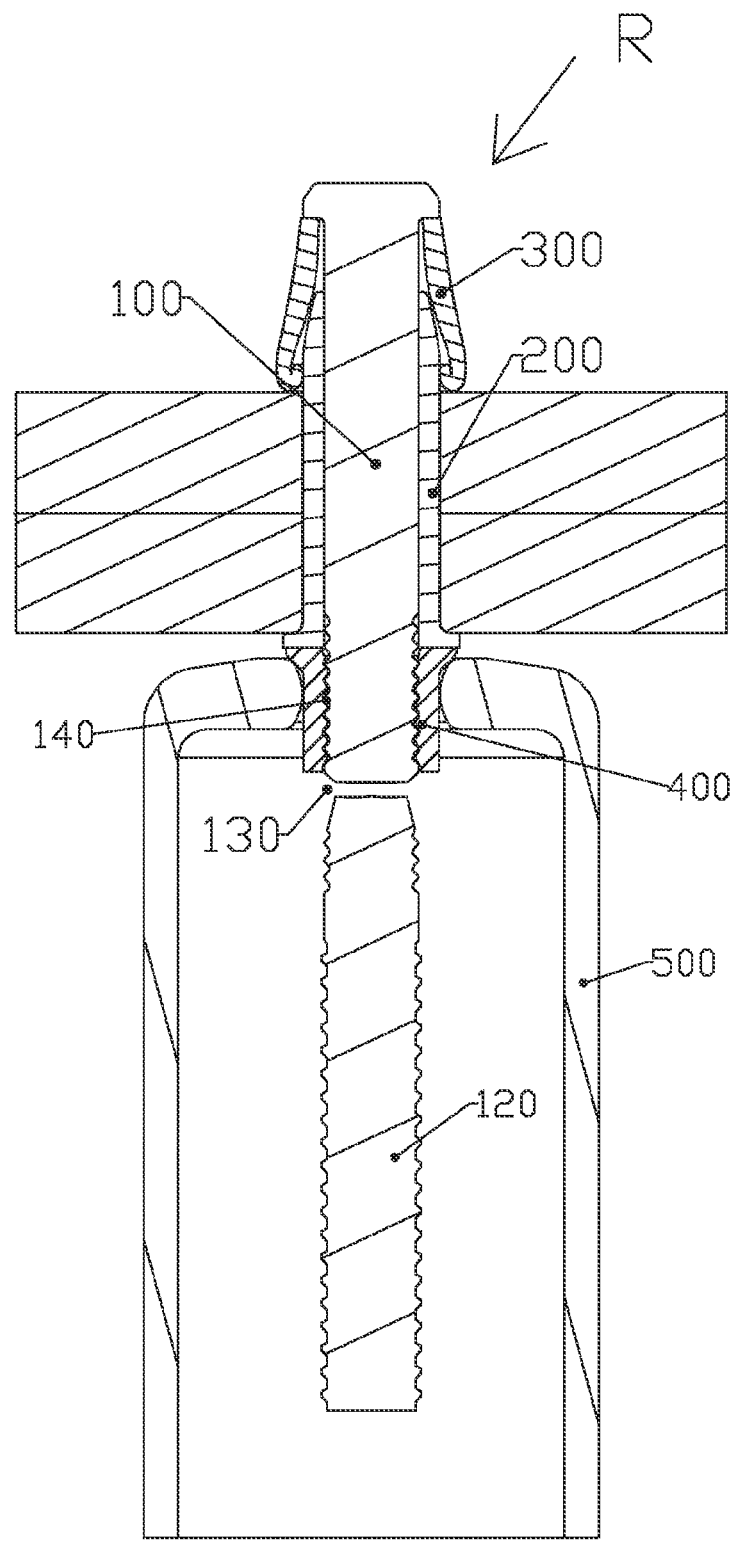

FIG. 8 shows the breaking off of the mandrel on the breaking groove once the bulb 300 is fully deformed and the ring 400 fully crimped. As shown, this ring is urged to crimp around the remaining end of the mandrel extending beyond the sleeve without being inserted into said sleeve. Indeed, the purpose of this crimping being to optimize the mechanical characteristics, the crimping must be carried out over a maximum of grooves.

In accordance with the invention, the structural and functional characteristics of the various elements comprising the rivet of the invention have made it possible to optimize and to guarantee the method of inserting described hereinabove.

These characteristics make it possible in addition to obtain a blind structure fixing inserted by traction proposing a clamp load, i.e. a clamping comparable to screwed fixings.

As such, in accordance with the invention and as shown in the drawing in FIG. 3, the breaking groove 130 is broken down into at least two truncated cones 131 and 132 connected by their small base in order to form the bottom 133 of the breaking groove 130, the truncated cone 131 located on the head side 110 having an angle that is greater than that of the truncated cone 132 located on the shank side 120. As such, using the same starting diameter defined by the bottom of the breaking groove and the same finishing diameter defined for example by the external diameter of the mandrel, the cone on the shank side is longer than that of the head side. As explained hereinabove, this preforming makes it possible to direct the deformation of the mandrel 100 consecutive to the traction load, of the shank side 120 and as such to retain intact the crimping grooves 140. According to a preferred embodiment, the angle α between the surface of the open truncated cone 131 with the plane wherein is inscribed the small base defining the bottom of the breaking groove 133 is equal to approximately half of the same angle β measured on the truncated cone with a more closed angle 132.

Still for directing the deformation of the mandrel towards the disposable part of the fixing, a plurality of embrittlement grooves 150 are arranged on the shank side 110 in the vicinity of the breaking groove 130. According to a preferred embodiment, these grooves are made with the same tools as for the crimping grooves which makes it possible to facilitate the manufacture of the latter and to reproduce the same profile. According to the preferred embodiment shown, this profile is semi-circular. Furthermore, the presence of grooves 150 machine tooled on this level of the mandrel 100 define a deformable section thanks to their groove bottom as well as a section with a greater guiding diameter for the crimping ring 400 thanks to the groove edges. Indeed, once the tubular elements are mounted on the mandrel, the embrittlement grooves 150 are advantageously positioned on the crimping ring and their edges adopt a diameter that cooperates with the diameter of said ring 400 in order to provide for its guiding. This guiding is particularly important for the proper transmission of the traction load which is carried out by means of the traction grooves 160 and for a proper deformation of the crimping ring.

Based on a mandrel such as the one which has just been described, an embodiment of the method for manufacturing such a rivet R is described hereinbelow.

Using a wire part of a given length that is to form the mandrel 100, a head 110 is formed via deformation of the material. Then the head and the shank portion located under the head 110 are machine tooled over a given length in order to form a precise cylindrical portion as well as crimping 140, breaking off 130 and embrittlement 150 grooves. The tubular elements, i.e. the bulb 300, the body 200 and the crimping ring 400 are then threaded onto the mandrel 100. The portion of the mandrel remaining free, i.e. that which is not covered by the tubular elements is then preformed by rolling in order to form the traction grooves 160. This operation of rolling has for consequence an increase in the diameter of the free portion of mandrel 100 which allows for an axial snug in order to maintain in position the tubular elements on the mandrel.

The use of machine tooling makes it possible to guarantee a precise guiding between the mandrel and the internal diameters of the tubular elements.

According to another characteristic optimizing the fixing proposed by the rivet of the invention, the crimping ring 400 has a hollow core with a changing diameter in order to adapt to the deformations to which it will undergo during its crimping (cf. FIGS. 6 and 7). As such, the crimping ring 400 has a hollow core of which the end 410 located on the end of ring 400 with which the inserting nose 500 first comes into contact, adopts an expanded form in order to propose a greater diameter in order in particular to offset the allowance adopted externally by this end of the ring and as such to avoid any damage to the crimping grooves 140.

According to a preferred but not limiting embodiment shown in the drawing in FIG. 3, the crimping grooves 140 adopt a semi-circular profile. This profile makes it possible to guarantee the taking into account of the axial pressures in particular clamp load and provides very high resistance to the axial pulling-out.

The bulb part 300 also underwent optimization. So, as shown in the drawing in FIG. 2 and in accordance with the invention, the separated mobile part referred to as the bulb 300 which has a first end 310 in contact with the head 110 of the mandrel 100 and a second end 320 in contact with the fixed part of the sleeve D referred to as the body 200, is preformed on its second end 320 in order to have a folding area 321 thanks to which the material of the second end of the bulb can be deformed, to open around the end 210 of the body 200. More precisely, this end 320 of bulb 300 adopting a folding area 321 is preformed internally and externally in order to turn over—as shown in the drawing in FIGS. 5 and 6—on the end 210 of the body 200 which is also preformed for this purpose.

This preforming is explained in detail hereinafter.

The external surface of the end 320 of the bulb 300 adopts the form of a cylinder of which the diameter shrinks progressively. According to the embodiment shown, this shrinking is carried out by the succession of two truncated cones 322 and 323.

The internal surface of the end 320 of the bulb 300 adopts the form of a cylinder of which the diameter expands and then shrinks. For this, the end of the hollow core of the bulb 300 adopts a form or follows an expanding truncated cone 324 then a shrinking truncated cone 325 and finally a cylinder 326 with a diameter less than that at the start. Advantageously, the folding area 321 proposed by this end 320 of the bulb 300 is implemented by the fact that the linking area between the large bases of the two internal truncated cones 324 and 325 is located in the same plane as the linking area between the external cylinder and the external truncated cone 322 of this end of the bulb.

The final internal diameter of this end is defined in order to propose a sliding arrangement with the body of the mandrel 100. This characteristic associated with the fact that the inner diameter of the first end 310 of bulb 300 is also defined in order to propose a sliding arrangement with the mandrel 100, guarantees a proper guiding of the bulb in its movement and in consequence proper distribution of the pressures provoking its deformation. This characteristic participates in the carrying out of an optimized fixing of a structure. It appears in the technological choice adopted, that the head of the mandrel is the sole axial bearing surface coming to bear against the sleeve. As such, only the deformation of the bulb requires a transmission of force through the mandrel. The breaking off of the mandrel thus depends exclusively on the proper bearing of the bulb on the part to be clamped. The blind rivet of the invention consequently makes it possible to undergo control of the fixing that it proposes since a poor fixing will result either in a projection or in a withdrawal of the remaining end of the mandrel in relation to the crimping ring.

According to the preferred embodiment shown, the contact surface between the end 320 of the bulb 300 and the end 210 of the body 200 is comprised of a plane surface delimited by the circles of the external diameter and of the internal diameter of this end. According to the embodiment shown, this plane surface is perpendicular to the axis of the mandrel 100 i.e. to the transmission axis of the pressures. As such, under the action of said force, the bulb 300 comes up against the body 200 and is obligated to deform in order to allow for the displacement of the mandrel 100. Through the folding area advantageously arranged in the bulb, the latter will fold while retaining until the last moment its end flat bearing against the end 210 of the body 200, which causes the turning over of the end of the bulb so that it is a rounded edge that comes into contact with the part P' to be fixed.

In order to accompany this turning over, the end of the body adopts itself, using the plane contact surface with the end of the bulb, a substantially tapered form expanding in the direction of the traction. More precisely, the end 210 has starting from the transversal contact surface an external surface broken down into two successive truncated cones 211 and 212 and expanding in the direction of the traction. Furthermore, in order to avoid a linking edge from causing an undesired folding, the linking area between the first truncated cone 211 and the plane bearing surface is comprised of a rounded edge 213.

The hollow core of the sleeve body 200 adopts a cylindrical form of a defined diameter in order to create a sliding arrangement with the mandrel 100.

Figure 9:
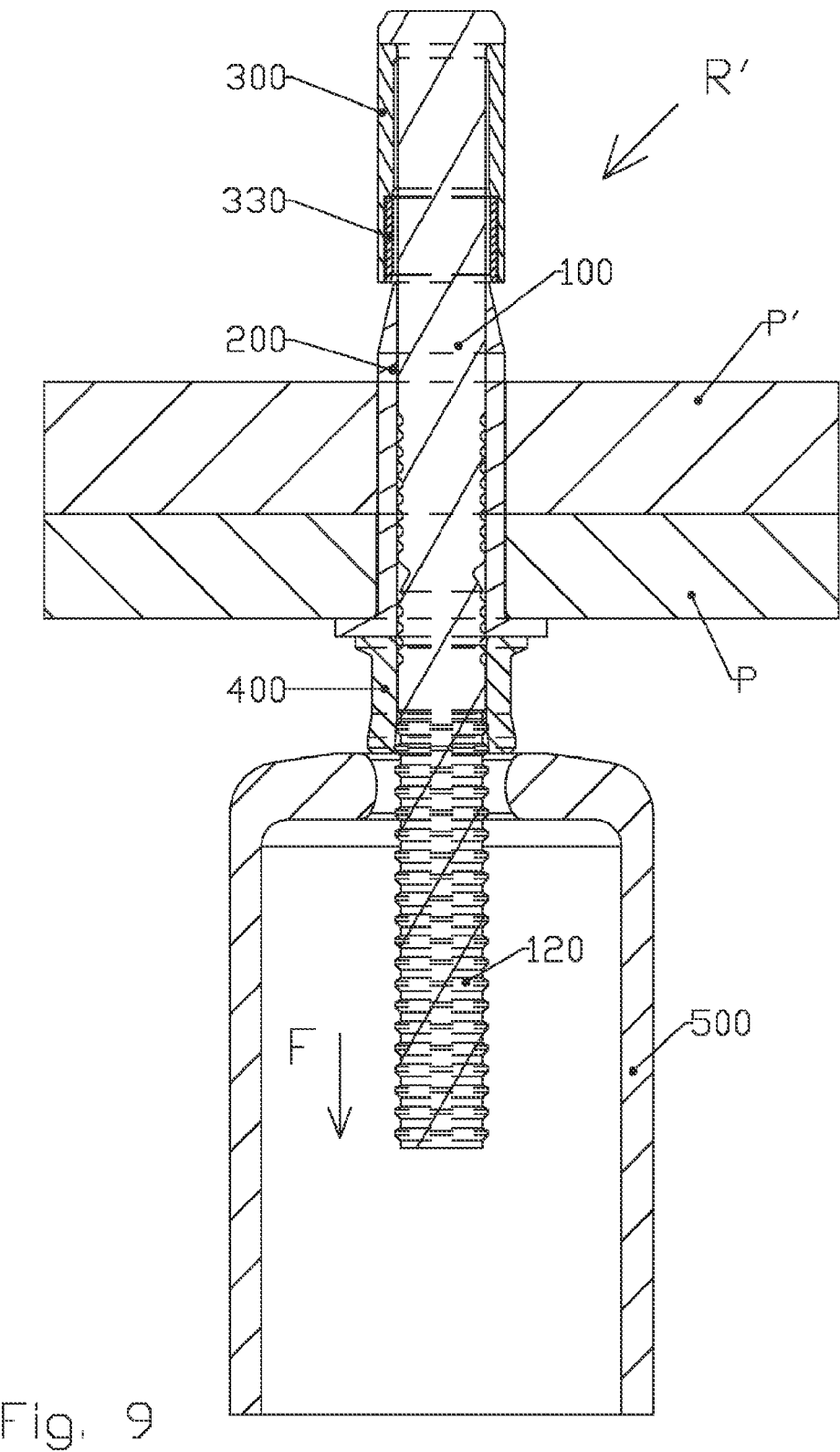
FIGS. 9 and 10 show the start and end of the inserting of another embodiment of the rivet in accordance with the invention, show the various steps of inserting of another embodiment of the rivet.
Figure 10:
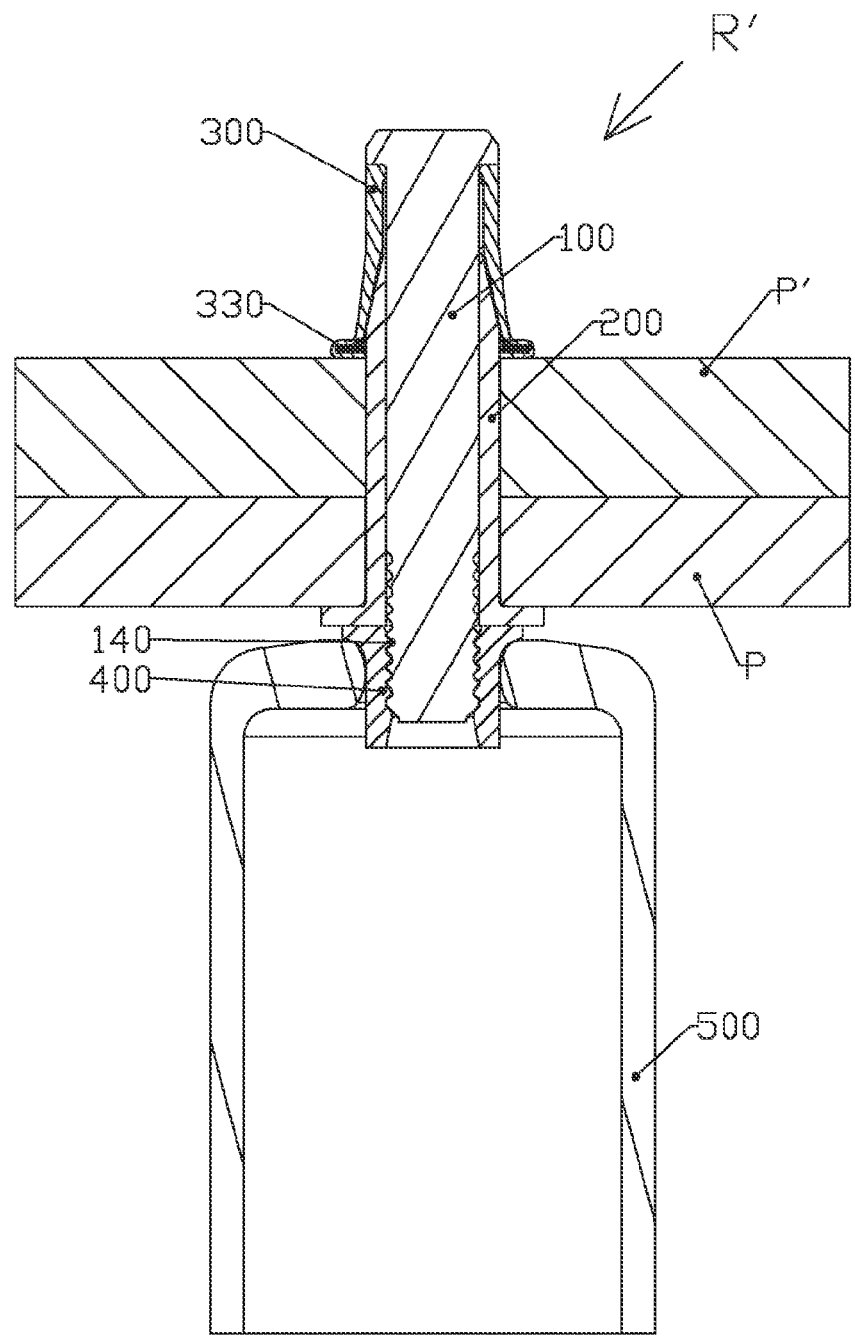

The embodiment shown in FIGS. 9 and 10, shows another means for creating a bulb that is as wide as possible. In this embodiment, the rivet R' is remarkable in that the mobile part 300 of the sleeve 200 is provided with an insert 330 which, coaxial to the mobile part of the sleeve 300, has a hardness that is less than the material of this portion of the sleeve. The presence of this insert 330 makes it possible to increase the range of the bulb during its formation on the assembly formed by the rivet R' as shown in the drawing in FIG. 10.

It is understood that the rivets, which have just been described and shown hereinabove, were described and shown for the purposes of a divulgation rather than of a limitation. Of course, various arrangements, modifications and improvements can be made to the example hereinabove, without however extending beyond the scope of the invention.

The invention claimed is:

1. A blind rivet comprising:
a hollow sleeve;
a crimping ring; and
a mandrel, received by the hollow sleeve and by the crimping ring, the mandrel comprising:
at a first end, a head configured to bear against the sleeve,
at a second end, a shank configured to receive a traction load from a tool,
a breaking groove which breaks off when the traction load reaches a certain value, the breaking groove including a breaking groove bottom, a first breaking-groove-side extending from the breaking groove bottom toward the shank, a second breaking-groove-side extending from the breaking groove bottom towards the head, the first breaking-groove-side and a central axis of the mandrel defining a first angle, the second breaking-groove-side and the central axis defining a second angle, the second angle being greater than the first angle, and
an embrittlement groove contiguous with the first breaking-groove-side, wherein
the shank is preformed with a plurality of crimping grooves and is dimensioned in such a way that once the shank is broken off on the breaking groove, a portion of the crimping grooves extend beyond the sleeve, and
the crimping ring is configured to crimp on the crimping grooves extending beyond the sleeve.

2. A blind rivet according to claim 1 further including a bulb configured to open around the sleeve in such a way as to form an extended bearing surface, wherein the bulb and the sleeve are preformed in such a way that the extended bearing surface includes a part that is rounded.

3. A blind rivet according to claim 1, further including a part which has a first end in contact with the head of the mandrel and a second end in contact with the sleeve, the second end being performed in order to have a tapered external form defining a third angle and a tapered internal form defining an angle different from the third angle.

4. A blind rivet according to claim 1, further including a part having a first end in contact with the head of the mandrel and a second end in contact with the sleeve, the part being made from a material that is different from that of the sleeve.

5. A blind rivet according to claim 1, wherein the crimping ring has a hollow core.

6. A blind rivet according to claim 1, further including a
a plurality of
embrittlement grooves positioned on the crimping ring.

7. A blind rivet according to claim 1, further including
a part having a first end in contact with the head of the mandrel and a second end in contact with the sleeve; and
an insert, coaxial with the sleeve, the insert having a hardness that is less than that of the part.

8. A blind rivet according to claim 1 wherein the embrittlement groove is on the first breaking-groove-side.

9. A blind rivet according to claim 1 further including a plurality of traction grooves, the plurality of traction grooves being non-contiguous with the embrittlement groove.

* * * * *